United States Patent
Li et al.

(10) Patent No.: US 12,180,112 B1
(45) Date of Patent: Dec. 31, 2024

(54) GAIN OPTICAL FIBER WITH DOUBLE-CLAD FLUORIDE AND ITS PREPARATION METHOD

(71) Applicant: Beijing University of Technology, Beijing (CN)

(72) Inventors: Pingxue Li, Beijing (CN); Chuanfei Yao, Beijing (CN); Guochuan Ren, Beijing (CN); Kaihang Li, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 18/809,407

(22) Filed: Aug. 20, 2024

(30) Foreign Application Priority Data

Aug. 24, 2023 (CN) .......................... 202311069110.9

(51) Int. Cl.
| | |
|---|---|
| C03C 3/32 | (2006.01) |
| C03C 25/1065 | (2018.01) |
| C03C 25/305 | (2018.01) |
| C03C 25/42 | (2006.01) |
| H01S 3/067 | (2006.01) |

(52) U.S. Cl.
CPC ............ *C03C 25/109* (2013.01); *C03C 3/325* (2013.01); *C03C 25/305* (2013.01); *C03C 25/42* (2013.01); *H01S 3/06716* (2013.01); *C03C 2203/10* (2013.01); *C03C 2217/285* (2013.01)

(58) Field of Classification Search
CPC ..... C03C 25/109; C03C 3/325; C03C 25/305; C03C 25/42; C03C 2203/10; C03C 2217/285; H01S 3/06716
See application file for complete search history.

(56) References Cited

U.S. PATENT DOCUMENTS

| | | | |
|---|---|---|---|
| 2004/0156401 A1 | 8/2004 | Sandrock et al. | |
| 2007/0217738 A1* | 9/2007 | Anderegg | ................ G02B 6/26 385/32 |
| 2023/0275388 A1* | 8/2023 | Qin | ........................ C03C 3/323 |

FOREIGN PATENT DOCUMENTS

| | | | | |
|---|---|---|---|---|
| CN | 1564033 A | 1/2005 | | |
| CN | 101186435 A | 5/2008 | | |
| CN | 101373239 A | 2/2009 | | |
| CN | 101428963 A | 5/2009 | | |
| CN | 115395356 A | 11/2022 | | |
| EP | 629587 A1 * | 12/1994 | ....... | C03B 37/01265 |
| EP | 1284247 A1 * | 2/2003 | ........... | C03C 13/048 |

* cited by examiner

*Primary Examiner* — Xinning(Tom) Niu
(74) *Attorney, Agent, or Firm* — Bayramoglu Law Offices LLC

(57) ABSTRACT

An optical fiber with a double-clad fluoride with low loss and high pump absorption efficiency, and its preparation method are provided. The gain optical fiber with the double-clad fluoride includes a fiber core, a D-shaped inner cladding, an outer cladding, and a polymer coating, wherein the fiber core, the inner cladding, and the outer cladding are all fluoride glass materials, and the polymer coating is a fluorinated ethylene propylene copolymer. The fiber core and inner cladding structure are prepared by a suction injection method, and the inner cladding is polished into a D-shaped structure, and the outer cladding is prepared by a core insertion casting method to form an optical fiber preform with D-shaped double-clad fluoride and draw an optical fiber.

4 Claims, 1 Drawing Sheet

GAIN OPTICAL FIBER WITH DOUBLE-CLAD FLUORIDE AND ITS PREPARATION METHOD

CROSS REFERENCE TO THE RELATED APPLICATIONS

This application is based upon and claims priority to Chinese Patent Application No. 202311069110.9, filed on Aug. 24, 2023, the entire contents of which are incorporated herein by reference.

TECHNICAL FIELD

The invention relates to optical fiber preform or optical fiber preparation, in particular to a gain optical fiber with double-clad fluoride and a preparation method for the gain optical fiber with double-clad fluoride.

BACKGROUND

Laser in the mid-infrared band of 3-5 μm has important application and research value in fields such as biomedicine, environmental monitoring, atmospheric remote sensing, and military confrontation. However, a quartz glass optical fiber that is the most widely used at present is limited by its high phonon energy, and the transmission loss of this optical fiber increases sharply after the wavelength is greater than 2.3 μm, which makes it impossible to apply it to the generation and transmission of laser in the mid-infrared band of 3-5 μm.

In recent years, mid infrared optical fiber materials widely studied mainly include a tellurite glass optical fiber, a fluoride glass optical fiber, and a chalcogenide glass optical fiber. The phonon energy of the tellurite glass optical fiber is 650-750 $cm^{-1}$, and the infrared cutoff wavelength can cover up to 6 μm, indicating a relatively high threshold for laser damage resistance. But its phonon energy is high, and hydroxyl groups are difficult to remove, making it unable to be used as a host material for gain optical fibers to achieve laser generation in a wavelength band with more than 3 μm. The chalcogenide glass optical fiber has extremely low phonon energy (300-450 $cm^{-1}$), and the infrared cutoff wavelength of Te-based chalcogenide glass optical fiber can reach up to 25 μm. It is the only glass system among all optical glasses with mid to far infrared transmission characteristics, which can be applied to mid infrared energy transmission and the generation of mid to far infrared supercontinuum spectra. However, the chalcogenide glass optical fiber suffers from severe Rayleigh scattering losses, difficulty in completely removing hydrogen and oxygen impurities as well as transition metal ion impurities, and low solubility of rare earth ions in the chalcogenide glass optical fiber itself. Currently, the chalcogenide glass optical fiber is still difficult to use as gain media for mid infrared laser generation.

The fluoride glass optical fiber has the characteristics of low phonon energy (about 500-600 $cm^{-1}$), high solubility of rare-earth ions and good light transmission performance. It is the only medium material for mid infrared fiber laser. At present, the main preparation method of the gain optical fiber with double-clad fluoride is a double crucible method and a preform method. The preparation process of the optical fiber with double-clad fluoride prepared by a double crucible method is complex, and the stability of glass is required because the glass is in the molten state for a long time. The outer coating material of the optical fiber with double-clad fluoride prepared by the double crucible method is a polymer coating layer, which is usually coated after the optical fiber is drawn. During the optical fiber drawing process, the optical fiber surface is easy to be polluted by impurities and eroded by water vapor in the air. When the high-power laser pumps, the polymer coating material is easy to be heated and deformed, affecting the long-term stability of the laser system. The optical fiber with double-clad fluoride drawn based on the preform method mainly includes a drilling method, an extrusion method and a rotating tube method. The drilling method can produce optical fibers with any core cladding ratio and any cross-section shape. However, due to the contamination of impurities at the interface of the core cladding caused by mechanical cold processing, low loss optical fibers cannot be obtained. Based on the extrusion method, optical fibers with any core cladding ratio and any cross-section shape can be prepared by designing a mold, but the extrusion mold is usually disposable ceramics, which makes the preparation cost of optical fibers higher, and the secondary heating of the extrusion process is easy to cause glass crystallization. The optical fiber with double-clad fluoride prepared based on the rotating tube method, the outer cladding of the preform is obtained by the rotating tube, and the inner cladding structure of the fiber core is a glass rod prepared by a suction injection method or a drilling method. Because there is an air gap between the outer cladding tube and the inner cladding, the problem of high interface loss is prone to occur for the air can't be eliminated during the optical fiber drawing process, and the optical fiber with special-shaped inner cladding structure with high pump absorption efficiency can't be prepared based on the rotating tube method, so the optical fiber with double-clad fluoride prepared by this method has a problem of a low pump absorption efficiency.

SUMMARY

In order to overcome the defects of the prior art, the technical problem to be solved by the invention is to provide an optical fiber with double-clad fluoride with low loss and high pump absorption efficiency.

The technical scheme of the invention is as follows.

The gain optical fiber with double-clad fluoride, comprising a fiber core (12), a D-shaped inner cladding (13), an outer cladding (14) and a polymer coating (15), wherein the fiber core, the inner cladding and the outer cladding are all fluoride glass materials, and the polymer coating is a fluorinated ethylene propylene copolymer.

A preparation method for the gain optical fiber with double-clad fluoride is also provided. The fiber core and inner cladding structure are prepared by a suction injection method, and the inner cladding is polished into a D-shaped structure, and the outer cladding is prepared by a core insertion casting method to form an optical fiber preform with D-shaped double-clad fluoride and draw an optical fiber.

Because the fiber core, inner cladding and outer cladding in the invention are all fluoride glass materials, and the polymer coating is a fluorinated ethylene propylene copolymer, the interface between the fiber core and the cladding is good and has low transmission loss. With D-type inner cladding structure, the fiber core has high pump light absorption efficiency. The preparation process is simple, the production cost is low, and the concentricity of the core cladding is high. The Teflon tube matched with the softening temperature of the fluoride fiber is used as the coating material, which can avoid the contact between the optical fiber surface and water vapor during the drawing process, reduce the surface crystallization, and significantly improve a mechanical strength of the optical fiber.

Figure 1:
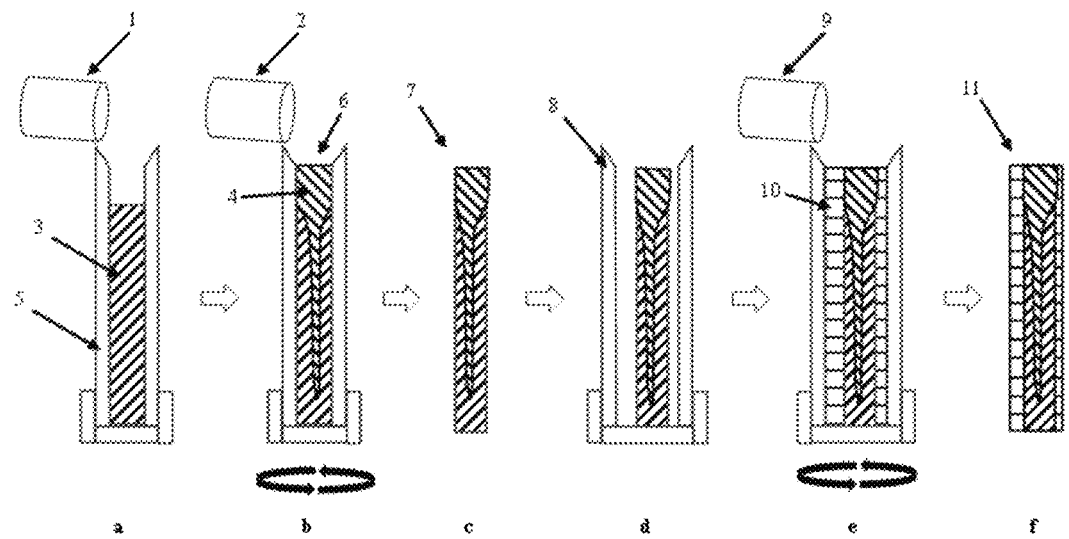
FIG. 1 is a schematic diagram showing the preparation method for the gain optical fiber with double-clad fluoride according to the present invention.

In the drawings: 1—No. 1 crucible, 2—No. 2 crucible, 3—an inner cladding glass material, 4—a fiber core glass material, 5—No. 1 mold, 6—a single cladding preform, 7—a D-shaped single cladding preform, 8—No. 2 mold, 9—No. 3 crucible, 10—an outer cladding glass material, 11—a D-shaped optical fiber preform with double-clad fluoride, 12—a fluoride optical fiber core, 13—a D-shaped inner cladding of a fluoride optical fiber, 14—an outer cladding of a fluoride optical fiber, 15—a polymer coating.

DETAILED DESCRIPTION OF THE EMBODIMENTS

In order to enable those in the art to better understand the scheme of the invention, the technical scheme in embodiments of the invention will be clearly and completely described below in combination with the attached drawings in the embodiments of the invention. Obviously, the described embodiments are only part of the embodiments of the invention, not all of them. Based on the embodiments of the invention, all other embodiments obtained by those skilled in the art without creative work should be within the scope of the invention.

It should be noted that the term "including" and any variation in the specification and claims of the invention and the above drawings are not intended to cover exclusive inclusion. For example, a process, method, means, product or device that contains a series of steps or units need not be limited to those steps or units clearly listed, but may include other steps or units that are not clearly listed or inherent to the process, method, product or device.

Figure 2:
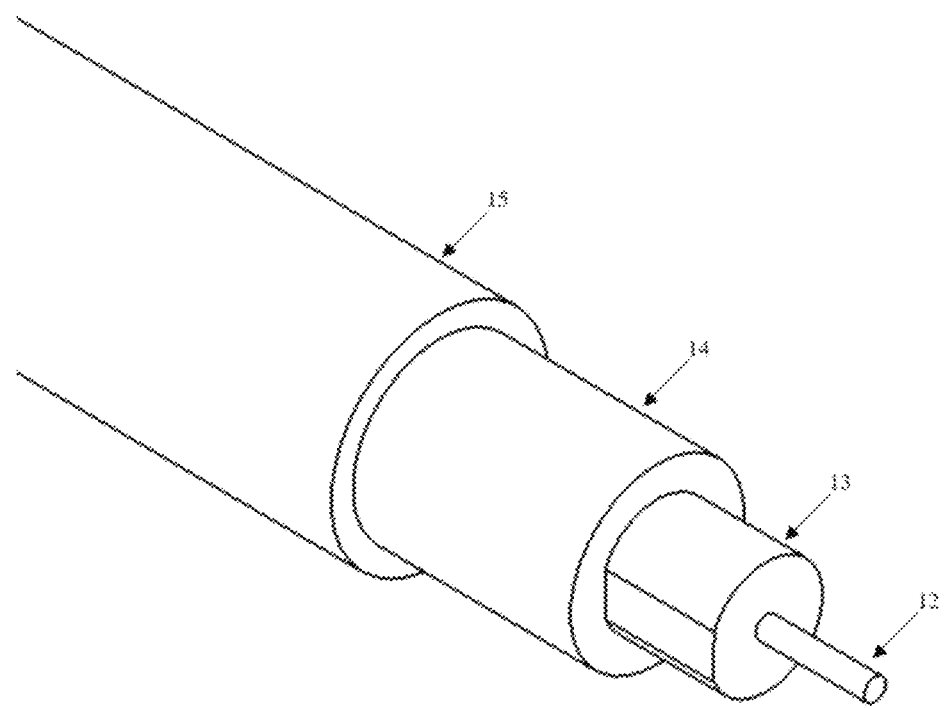
FIG. 2 is a schematic diagram showing the gain optical fiber with double-clad fluoride according to the present invention.

As shown in FIG. 2, the gain optical fiber with double-clad fluoride, comprising a fiber core 12, a D-shaped inner cladding 13, an outer cladding 14 and a polymer coating 15, wherein the fiber core, the inner cladding and the outer cladding are all fluoride glass materials, and the polymer coating is a fluorinated ethylene propylene copolymer.

A preparation method for the gain optical fiber with double-clad fluoride is also provided. The fiber core and inner cladding structure are prepared by a suction injection method, and the inner cladding is polished into a D-shaped structure, and the outer cladding is prepared by a core insertion casting method to form an optical fiber preform with D-shaped double-clad fluoride and draw an optical fiber.

Because the fiber core, inner cladding and outer cladding in the invention are all fluoride glass materials, and the polymer coating is a fluorinated ethylene propylene copolymer, the interface between the fiber core and the cladding is good and has low transmission loss. With D-type inner cladding structure, the fiber core has high pump light absorption efficiency. The preparation process is simple, the production cost is low, and the concentricity of the core cladding is high. The Teflon tube matched with the softening temperature of the fluoride fiber is used as the coating material, which can avoid the contact between the optical fiber surface and water vapor during the drawing process, reduce the surface crystallization, and significantly improve a mechanical strength of the optical fiber.

Preferably, the raw material composition of the fluoride glass material of the fiber core is $ZrF_4$—$BaF_2$—$LaF_3$—$YF_3$—$AlF_3$—$LiF$—$PbF_2$—$ErF_3$—$NH_4HF_2$, the raw material composition of the fluoride glass material of the inner cladding is $ZrF_4$—$BaF_2$—$LaF_3$—$YF_3$—$AlF_3$—$LiF$—$NH_4HF_2$, and the raw material composition of the fluoride glass material of the outer cladding is $ZrF_4$—$BaF_2$—$LaF_3$—$YF_3$—$AlF_3$—$NaF$—$NH_4HF_2$.

Preferably, glass transition temperatures of the material of the fiber core, D-shaped inner cladding, outer cladding and polymer coating increase in turn.

Preferably, a glass transition temperature difference among the material of the fiber core, D-shaped inner cladding, outer cladding and polymer coating is within 10° C.

Preferably, the diameter of the fiber core is 5-50 μm, the distance between long sides of the D-shaped inner cladding is 80-300 μm, the distance between short sides is 60-280 μm, and the diameter of the outer cladding is 150-400 μm.

Preferably, different size proportions of the fiber core, inner cladding and outer cladding are controlled by selecting a position of a fiber core cone, polishing degree of the inner cladding and a size of a mold.

As shown in FIG. 1, the preparation method for the gain optical fiber with double-clad fluoride, comprising the following steps:

(1) weighing the raw material components of the fluoride glass material of the fiber core and inner cladding separately in a glove box filled with nitrogen, grinding each raw material in an agate mortar for 30 minutes, mixing each raw material fully and evenly, putting them into a platinum crucible respectively, transferring the platinum crucible to a high-temperature furnace, setting a temperature program to heat it at 300-400° C. for 2-4 hours for fluorination, heating it at 500° C. for 1 hour to remove excess ammonium hydrogen fluoride, melting it at 800-850° C. for 2 hours, pouring the fully melted inner cladding and core glass solution into a brass mold preheated at 270° C. in turn, transferring it to an annealing furnace after the glass solution solidifying, and slowly cooling to a room temperature after annealing at 280° C. for 6 hours, (2) grounding the single cladding preform cooled to the room temperature into a D-shaped cross-section structure, and polishing every surface to optical quality, (3) fixing the D-shaped single cladding preform in a center of the mold with an inner diameter greater than an outer diameter of the preform, and placing it in the annealing furnace at 270° C. for preheating, (4) weighing and mixing the raw material components of the outer cladding glass material, grinding it in the agate mortar for 30 minutes, transferring it to a platinum crucible, putting it into a high-temperature furnace for fluorination and impurity removal, taking it out after melting it at 800-850° C. for 2 hours, pouring slowly the glass solution of the outer cladding along the side wall of the mold preheated and placed on a rotary table, transferring the mold to the annealing furnace after the glass solution is solidified, and slowly cooling to the room temperature after annealing at 280° C. for 6 hours to form a D-shaped optical fiber preform with double-clad fluoride, (5) inserting it into a Teflon tube and placing it on an optical fiber drawing tower after polishing the surfaces of the prepared D-shaped optical fiber preform with double-clad fluoride, injecting a constant flow of nitrogen into the furnace, raising the temperature until the glass softens, controlling a tension by adjusting the temperature, adjusting a speed of feeding the preform and a traction speed of the optical fiber to obtain gain optical fibers with double-clad fluoride with different diameters.

Preferably, in step (5), grounding and polishing the annealed and cooled preform with double-clad fluoride to optical quality by selecting 400, 800, 1200, 2500, 5000, 7000 mesh sandpaper and grinding oil, carrying out ultrasonic cleaning with anhydrous ethanol on the preform surfaces, and then placing it in a drying oven at 100° C. for 10 hours.

Preferably, in step (5), sheathing the dried D-shaped optical fiber preform with double-clad fluoride with a Teflon tube with matching dimensions and appropriate wall thickness, fixing on the optical fiber drawing tower, blowing the constant flow of nitrogen into the furnace, raising the temperature until the glass softens at 400° C., controlling a tension by adjusting the temperature, and adjusting a speed of feeding the preform and a traction speed of the optical fiber to obtain optical fibers with double-clad fluoride with a diameter of 150-400 μm.

The invention will be further described in detail below in combination with the accompanying drawings.

This embodiment provides a D-shaped gain optical fiber with double-clad fluoride, in which step 1, step 2, step 4, step 5 and step 6 are completed in a glove box filled with nitrogen, and comprising the following steps:

Step 1: weighing 20 g of the raw material components of the fiber core according to the ratio of $ZrF_4$, $BaF_2$, $LaF_3$, $YF_3$, $AlF_3$, LiF, $PbF_2$, $ErF_3$ 54:21:3:2:3:7:9:1, adding 10 wt % $NH_4HF_2$ for mixing, grinding it in a mortar for 30 minutes, and then putting it into No. 1 platinum crucible.

weighing 40 g of the raw material components of the fiber core according to the ratio of $ZrF_4$, $BaF_2$, $LaF_3$, $YF_3$, $AlF_3$, LiF 58:21:5:2:4:10, adding 10 wt % $NH_4HF_2$ for mixing, grinding it in a mortar for 30 minutes, and then putting it into No. 2 platinum crucible.

The ratio of the fiber core and inner cladding components can be adjusted appropriately according to required optical properties.

Step 2: as shown in FIG. 1, transferring the platinum crucible containing the fiber core and cladding raw materials in step 1 to a high-temperature furnace, setting a temperature program to heat it at 300-400° C. for 2-4 hours for fluorination, heating it at 500° C. for 1 hour to remove excess ammonium hydrogen fluoride, melting it at 800-850° C. for 2 hours, pouring the fully melted inner cladding solution 3 and core glass solution 4 into a brass mold 5 preheated at 270° C. in turn, due to the cold shrinkage of the glass solution, sucking the fiber core into the center of the cladding glass to form a single cladding preform 6, transferring it to an annealing furnace after the glass solution solidifying, and slowly cooling to a room temperature after annealing at 280° C. for 6 hours.

Step 3: grounding and polishing the annealed and cooled preform with double-clad fluoride to optical quality by selecting 400, 800, 1200, 2500, 5000, 7000 mesh sandpaper and grinding oil, grounding the single cladding preform 6 cooled to the room temperature into a D-shaped cross-section structure, polishing every surface to optical quality to gain a D-shaped single cladding preform, carrying out ultrasonic cleaning with anhydrous ethanol on the preform 7 surfaces, and then placing it in a drying oven at 100° C. for 10 hours.

Step 4: weighing 20 g of the raw material components of the outer cladding according to the ratio of $ZrF_4$, $BaF_2$, $LaF_3$, $YF_3$, $AlF_3$, NaF 54:20:4:2:5:15, adding 10 wt % $NH_4HF_2$ for mixing, grinding it in a mortar for 30 minutes, putting it into No. 1 platinum crucible, transferring the platinum crucible to the high-temperature furnace, setting a temperature program to heat it at 300-400° C. for 2-4 hours for fluorination, heating it at 500° C. for 1 hour to remove excess ammonium hydrogen fluoride, melting it at 800-850° C. for 2 hours.

Step 5: at the same time as step 4, fixing the D-shaped single cladding preform 7 in a center of the brass mold 8, and placing it in the annealing furnace at 270° C. for preheating.

Step 6: placing the preheated brass mold 8 inserted with the D-shaped single cladding preform 7 in the center of the rotary table slowly rotating, taking out the platinum crucible 9 containing the molten cladding glass solution 10, slowly and evenly pouring it around the D-shaped single cladding preform 7 along the side wall of the brass mold 8 to form the D-shaped optical fiber preform with double-clad fluoride 11 when the temperature of the glass solution drops below 500° C., transferring it to an annealing furnace after the glass solution solidifying, and slowly cooling to a room temperature after annealing at 280° C. for 6 hours.

Step 7: grounding and polishing the annealed and cooled D-shaped preform with double-clad fluoride 11 to optical quality by selecting 400, 800, 1200, 2500, 5000, 7000 mesh sandpaper and grinding oil, carrying out ultrasonic cleaning with anhydrous ethanol on the preform surfaces, and then placing it in a drying oven at 100° C. for 10 hours.

Step 8: sheathing the dried D-shaped optical fiber preform with double-clad fluoride with a Teflon tube with matching dimensions and appropriate wall thickness, fixing on the optical fiber drawing tower, blowing the constant flow of nitrogen into the furnace, raising the temperature until the glass softens at 400° C., controlling a tension by adjusting the temperature, and adjusting a speed of feeding the preform and a traction speed of the optical fiber to obtain optical fibers with double-clad fluoride with a diameter of 150-400 μm. The optical fiber structure of the D-shaped gain optical fiber with double-clad fluoride is shown in FIG. 2, including the fluoride optical fiber core 12, the D-shaped inner cladding 13, the outer cladding of a fluoride optical fiber 14, the polymer coating of the fluorinated ethylene propylene copolymer 15.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A gain optical fiber with a double-clad fluoride, comprising a fiber core, a D-shaped inner cladding, an outer cladding, and a polymer coating, wherein the fiber core, the D-shaped inner cladding, and the outer cladding each are a fluoride glass material, and the polymer coating is a fluorinated ethylene propylene copolymer, a raw material composition of the fluoride glass material of the fiber core is $ZrF_4$—$BaF_2$—$LaF_3$—$YF_3$—$AlF_3$—LiF—$PbF_2$—$ErF_3$—$NH_4HF_2$, a raw material composition of the fluoride glass material of the D-shaped inner cladding is $ZrF_4$—$BaF_2$—$LaF_3$—$YF_3$—$AlF_3$—LiF—$NH_4HF_2$, and a raw material composition of the fluoride glass material of the outer cladding is $ZrF_4$—$BaF_2$—$LaF_3$—$YF_3$—$AlF_3$—NaF—$NH_4HF_2$, glass transition temperatures of a material of the fiber core, the D-shaped inner cladding, the outer cladding, and the polymer coating increase in turn, the fiber core and the D-shaped inner cladding are prepared by a suction injection method, and the D-shaped inner cladding is polished into a D-shaped structure, and the outer cladding is prepared by a core insertion casting method to form an optical fiber preform with a D-shaped double-clad fluoride and draw an optical fiber.

2. The preparation method for the gain optical fiber with the double-clad fluoride according to claim 1, comprising the following steps:

(1) weighing the raw material composition of the fluoride glass material of the fiber core and the raw material composition of the fluoride glass material of the D-shaped inner cladding separately in a glove box filled with nitrogen, grinding each raw material in an agate mortar for 30 minutes, mixing the each raw material fully and evenly, putting each mixed raw material into a platinum crucible respectively, transferring the platinum crucible to a high-temperature furnace, setting a temperature program to heat at 300-400° C. for 2-4 hours for a fluorination, heating at 500° C. for 1 hour to remove excess ammonium hydrogen fluoride, melting at 800-850° C. for 2 hours, pouring a fully melted inner cladding glass solution and a fully melted fiber core glass solution into a brass mold preheated at 270° C. in turn, transferring to an annealing furnace after the glass solution solidifying, and slowly cooling to a room temperature after annealing at 280° C. for 6 hours, (2) grinding a single cladding preform cooled to the room temperature into a D-shaped cross-section structure, and polishing every surface to an optical quality, (3) fixing a D-shaped single cladding preform in a center of a mold with an inner diameter greater than an outer diameter of the D-shaped single cladding preform, and placing in the annealing furnace at 270° C. for preheating, (4) weighing and mixing the raw material composition of the fluoride glass material of the outer cladding, grinding in the agate mortar for 30 minutes, transferring to the platinum crucible, putting into the high-temperature furnace for the fluorination and an impurity removal, taking out after melting at 800-850° C. for 2 hours, pouring slowly a glass solution of the outer cladding along a side wall of the mold preheated and placed on a rotary table, transferring the mold to the annealing furnace after the glass solution is solidified, and slowly cooling to the room temperature after annealing at 280° C. for 6 hours to form a D-shaped optical fiber preform with the double-clad fluoride, (5) inserting the D-shaped optical fiber preform with the double-clad fluoride into a Teflon tube and placing on an optical fiber drawing tower after polishing surfaces of the D-shaped optical fiber preform with the double-clad fluoride, injecting a constant flow of nitrogen into the high-temperature furnace, raising a temperature until a glass softens, controlling a tension by adjusting the temperature, adjusting a speed of feeding the D-shaped optical fiber preform and a traction speed of the optical fiber to obtain gain optical fibers with the double-clad fluoride with different diameters.

3. The preparation method for the gain optical fiber with the double-clad fluoride according to claim 2, wherein in step (5), grinding and polishing an annealed and cooled D-shaped optical fiber preform with double-clad fluoride to the optical quality by selecting 400, 800, 1200, 2500, 5000, 7000 mesh sandpaper and grinding oil, carrying out an ultrasonic cleaning with anhydrous ethanol on preform surfaces, and then placing in a drying oven at 100° C. for 10 hours.

4. The preparation method for the gain optical fiber with the double-clad fluoride according to claim 3, wherein in step (5), sheathing a dried D-shaped optical fiber preform with the double-clad fluoride with the Teflon tube with matching dimensions and appropriate wall thickness, fixing on the optical fiber drawing tower, blowing the constant flow of nitrogen into the high-temperature furnace, raising the temperature until the glass softens at 400° C., controlling the tension by adjusting the temperature, and adjusting the speed of feeding the D-shaped optical fiber preform and the traction speed of the optical fiber to obtain optical fibers with the double-clad fluoride with a diameter of 150-400 μm.

* * * * *